(12) United States Patent
Yamada et al.

(10) Patent No.: US 8,061,612 B2
(45) Date of Patent: Nov. 22, 2011

(54) CODE SYMBOL READING APPARATUS

(75) Inventors: Yoshiya Yamada, Shizuoka (JP);
  Hitoshi Iizaka, Shizuoka (JP); Hidemi Mihara, Shizuoka (JP); Osamu Tsuchiya, Shizuoka (JP); Hidehiro Naito, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 406 days.

(21) Appl. No.: 12/417,302

(22) Filed: Apr. 2, 2009

(65) Prior Publication Data

US 2009/0250519 A1    Oct. 8, 2009

(30) Foreign Application Priority Data

Apr. 4, 2008   (JP) ................... 2008-097822

(51) Int. Cl.
  *G06K 7/10*   (2006.01)

(52) U.S. Cl. ............... 235/454; 235/383; 235/462.11; 235/462.44; 235/462.21; 235/462.41

(58) Field of Classification Search ............ 235/383, 235/454, 462.11, 462.14, 462.21, 462.24, 235/462.41, 462.43, 46, 2.44

See application file for complete search history.

(56) References Cited

U.S. PATENT DOCUMENTS

| | | | | |
|---|---|---|---|---|
| 5,177,345 A | * | 1/1993 | Baitz | 186/61 |
| 2007/0029389 A1 | * | 2/2007 | Good et al. | 235/462.14 |
| 2007/0290043 A1 | * | 12/2007 | Russell et al. | 235/462.14 |
| 2008/0283603 A1 | * | 11/2008 | Barron et al. | 235/454 |

FOREIGN PATENT DOCUMENTS

| | | |
|---|---|---|
| CN | 1256473 A | 6/2000 |
| JP | 11-339123 | 12/1999 |
| JP | 2001-167224 A | 6/2001 |
| JP | 2004-184639 A | 7/2004 |
| JP | 2005-025311 | 1/2005 |

OTHER PUBLICATIONS

Chinese Office Action for 200910131523.9 Mailed on Dec. 29, 2010.

* cited by examiner

*Primary Examiner* — Michael G Lee
*Assistant Examiner* — Kristy A Haupt
(74) *Attorney, Agent, or Firm* — Turocy & Watson, LLP

(57) ABSTRACT

A housing is mounted on a counter on which a basket for containing a commodity to be purchased is placed and is disposed at a position where it confronts an operator. A read window confronting a read area of a code symbol attached to a commodity is disposed on the front of the housing, and an image pickup section including a CCD area sensor having, as an image pickup area, a read area of the code symbol is incorporated at the back of the read window. An LED light source irradiates illuminating light for illuminating the code symbol, which is necessary for the area CCD sensor to take an image of the code symbol. The LED light source has an optical axis nonparallel to a read optical axis of the area image pickup device and guides the illuminating light to the read area from a position above the area image pickup device.

8 Claims, 3 Drawing Sheets

CODE SYMBOL READING APPARATUS

CROSS REFERENCE TO RELATED APPLICATION

This application is based upon and claims the benefit of priority from Japanese Patent Application No. 2008-097822, filed on Apr. 4, 2008, the entire content of which is incorporated herein by reference.

TECHNICAL FIELD

The present invention relates to a code symbol reading apparatus which takes an image of a code symbol, such as a barcode, attached to a commodity by an area image pickup device such as a CCD area sensor and reads code information of the code symbol.

BACKGROUND

A code symbol reading apparatus optically reads an image of a code symbol, such as a barcode, attached to a commodity, decodes the read image and acquires code information (commodity code or the like) of the code symbol. JP-A-2005-025311 discloses, as one of this kind of code symbol reading apparatuses, an apparatus using an area image pickup device such as a CCD area sensor. The code symbol reading apparatus takes an image of, for example, a barcode attached to a commodity by the CCD area sensor as the area image pickup device, decodes the output of the CCD area sensor and acquires code information of the barcode, that is, a commodity code. This kind of code symbol reading apparatus requires that an illuminating apparatus illuminates a read area of a code symbol such as a barcode, which is an image pickup area of the CCD area sensor. As an example, the illuminating apparatus illuminates the read area in such a manner that plural LED light sources surround the CCD area sensor. Also in the code symbol reading apparatus disclosed in JP-A-2005-025311, plural LEDs to illuminate the barcode are arranged around the CCD area sensor.

A code symbol reading apparatus of a stationary type that is disposed on a counter on which a basket for containing commodities to be purchased is placed, that is, what is called a vertical scanner is widespread (see, for example, JP-A-11-339123). The stationary type vertical scanner is typically arranged so that a read window of a read surface confronts the operator. The operator holds a code symbol such as a barcode attached to a commodity to the read window and reads the code symbol. Accordingly, when the area image pickup device is used in the vertical scanner, light from the LED light sources arranged around the area image pickup device enters the eyes of the operator. By this, the operator feels glare.

SUMMARY

An object of the invention is to provide a code symbol reading apparatus with which, even when configured in a vertical scanner type code symbol reading apparatus in which a read surface confronts an operator, the operator does not feel glare due to illumination light for illuminating a code symbol.

According to an aspect of the invention, a code symbol reading apparatus includes a housing that is disposed on a counter on which a basket for containing a commodity to be purchased is placed and is disposed at a position where the housing confronts an operator, a read window positioned on a front of the housing, an image pickup section having an area image pickup device that is arranged at the back of the read window and has, as an image pickup area, a read area of a code symbol attached to a commodity, and an illuminating section that has an optical axis nonparallel to a read optical axis of the area image pickup device and illuminates the read area from a position above the area image pickup device.

DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION

An embodiment of the invention will be described with reference to FIG. 1 to FIG. 3. A code symbol reading apparatus of the embodiment is a barcode scanner 101 which is connected to a POS terminal 11 and is used as a peripheral equipment of the POS terminal 11 used for a checkout system 1 in a supermarket or the like.

Figure 1:
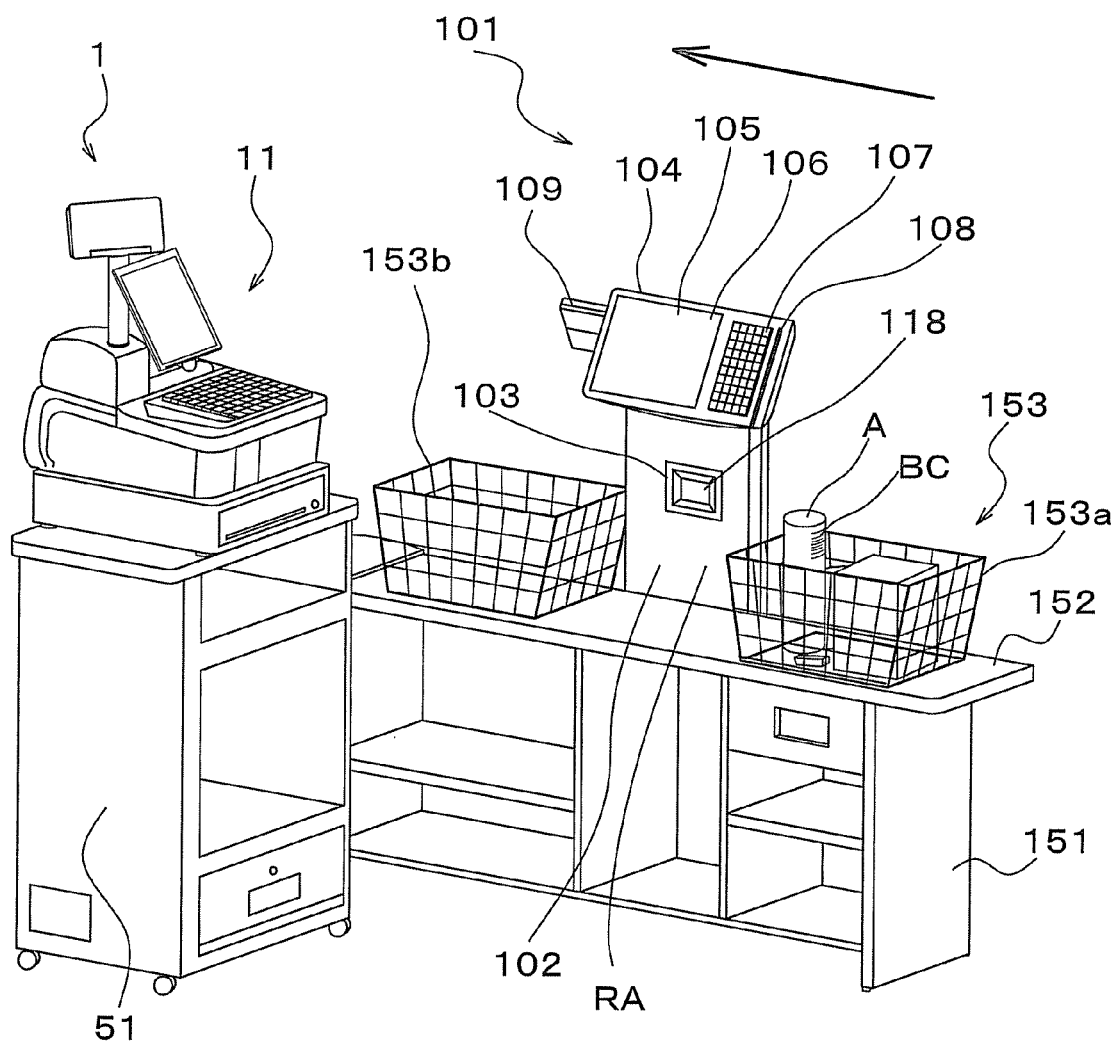
FIG. 1 is a perspective view of a checkout system including a barcode scanner (code symbol reading apparatus) of an embodiment of the invention.

FIG. 1 is a perspective view of the checkout system 1 including the barcode scanner 101 (code symbol reading apparatus) and the POS terminal 11. The checkout system 1 includes the POS terminal 11 mounted on a checkout stand 51 and the barcode scanner 101 as the code symbol reading apparatus connected to the POS terminal 11 such that data can be freely transmitted and received. The barcode scanner 101 is of a stationary type that is fixed to a commodity receiving surface 152 provided on the upper surface of a counter 151 having a laterally long table shape. A basket 153 for containing a commodity A is placed on the commodity receiving surface 152. The basket 153 can be conceptually categorized into a first basket 153a in which the customer puts the commodity A to be purchased and which is placed on the commodity receiving surface 152 of the counter 151, and a second basket 153b positioned at a position opposite to the first basket 153a across the barcode scanner 101. The first basket 153a is positioned at an upstream side in the flow direction of the customer, and the second basket 153b is positioned at a downstream side in the flow direction of the customer. The direction of the flow of the customer is indicated by an arrow in FIG. 1.

The barcode scanner 101 is of a vertical scanner type that is disposed on the commodity receiving surface 152 of the counter 151 at the farther side when viewed from the operator. That is, the barcode scanner 101 includes a housing 102 having a thin rectangular shape with a wide width and a narrow depth, a read window 103 is arranged on the front of the housing 102, and an operation section 104 is attached to an upper part of the housing 102. The read window 103 confronts a read area RA for optically reading a barcode BC as a code symbol attached to the commodity A and is positioned on the front of the housing 102. In the arrangement as stated above, the read area RA of the barcode BC is positioned above the commodity receiving surface 152 and confronts the read window 103. The operation section 104 extends to the nearer side than the front of the housing 102, and its front part is inclined downward. The operation section 104 includes a display 106 on which a touch panel 105 is laminated, and a keyboard 107 in which plural keytops are arranged in matrix shape is provided to be adjacent to the right of the display 106. In FIG. 1, a vertically long groove shown on the immediately right of the keyboard 107 is a card read groove 108 of a not-shown card reader for reading a magnetic card such as a credit card. In the barcode scanner 101, a customer display 109 for providing information to the customer is installed on the back, left and farther side of the operation section 104 when viewed from the operator.

In the checkout system 1 of the structure as stated above, the operator reads the barcode BC attached to the commodity A contained in the first basket 153a by the barcode scanner 101, and puts the commodity A into the second bracket 153b after the barcode BC is read. The barcode scanner 101 reads the barcode BC attached to the commodity A to be purchased by the customer. The barcode scanner 101 decodes the read barcode BC, analyzes the commodity code that specifies the commodity A, and transmits the analyzed commodity code to the POS terminal 11. The POS terminal 11 performs a checkout process based on the commodity code transmitted from the barcode scanner 101.

The checkout stand 51 on which the POS terminal 11 is mounted is positioned at the end of the counter 151 so as to form an L shape in combination with the counter 151. The operator can efficiently perform the read operation of the barcode by the barcode scanner 101 and the checkout operation by the POS terminal 11. Alternatively, a two-person system can be easily adopted in which one shop clerk as an operator is engaged in the read operation of the barcode by the barcode scanner 101, and another shop clerk as a casher is engaged in the checkout operation by the POS terminal 11.

Figure 2:
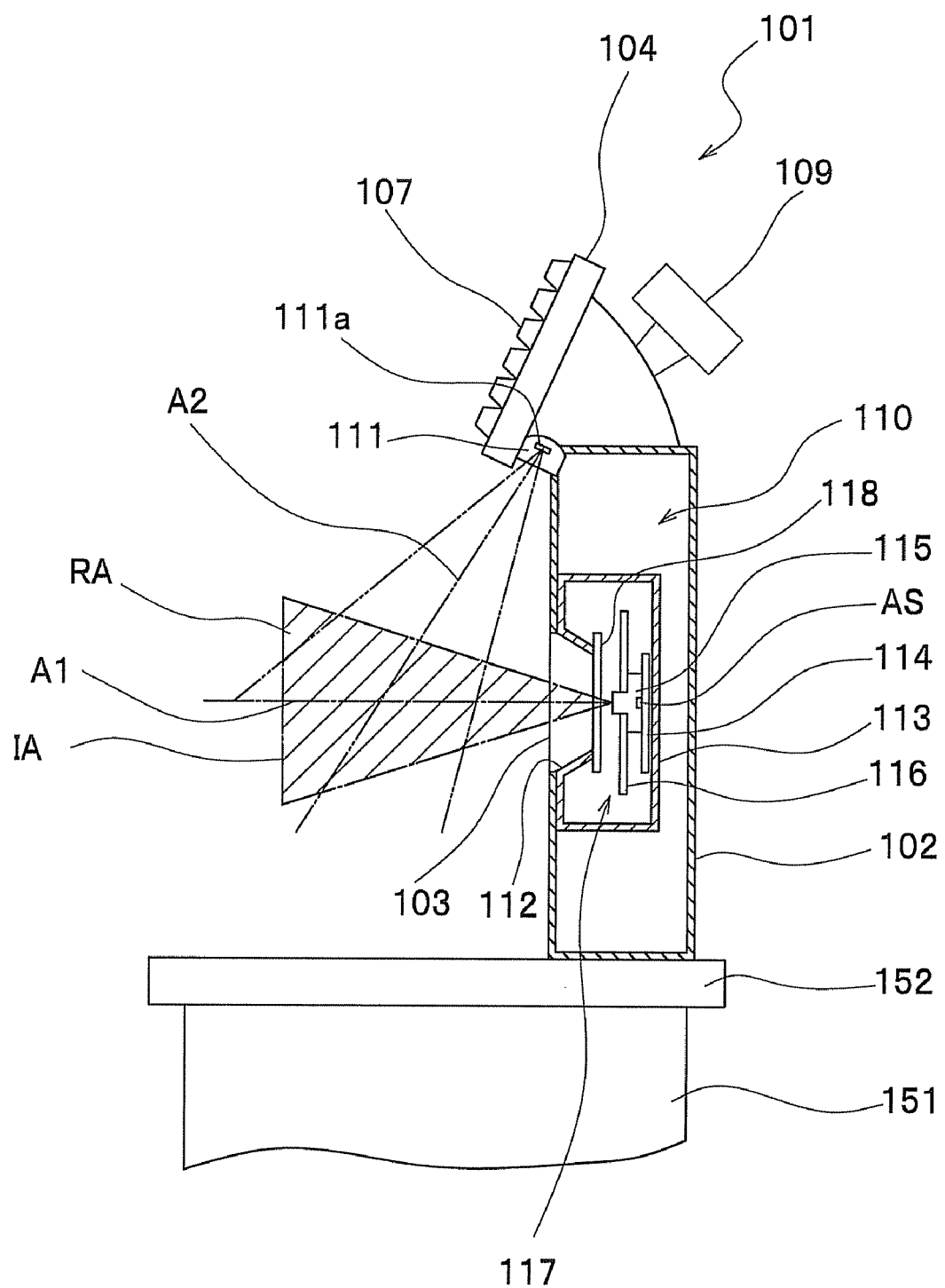
FIG. 2 is a schematic vertical sectional side view of the barcode scanner.

FIG. 2 is a schematic vertical sectional side view of the barcode scanner 101. The barcode scanner 101 incorporates a scanner unit 110 in the housing 102. In the barcode scanner 101, an illuminating section 111 is attached at a lower position of the operation section 104. The scanner unit 110 incorporates an image pickup board 114 provided with a CCD area sensor AS as an area image pickup device, a lens 115 attached to the image pickup board 114, and an image processing board 116 attached to the lens 115 in the inside of a unit housing 113 having, on one surface, an opening recess 112 opening into a mortar shape.

The image pickup board 114 is fixed to the bottom of the unit housing 113 so that a read optical axis A1 of the CCD area sensor AS is coincident with the center of the opening recess 112. The image pickup board 114 includes an amplifier and an A/D converter (neither of them is shown) to amplify the output of the CCD area sensor AS, convert it into a digital signal and output it.

The lens 115 is attached to the image pickup board 114 while its optical axis is coincident with the optical axis of the CCD area sensor AS.

The image processing board 116 is fixed to the periphery of the lens 115. The image processing board 116 decodes the image of the barcode BC taken by the CCD area sensor AS, which is converted into the digital signal and is outputted from the image pickup board 114, and analyzes the commodity code as the code information symbolized by the barcode BC. The image processing board 116 outputs the analyzed commodity code to the POS terminal 11.

The housing 102 of the barcode scanner 101 incorporates the scanner unit 110 constructed as stated above while the position of the opening recess 112 is positioned at the read window 103. In this state, in the CCD area sensor AS provided on the image pickup board 114, the read optical axis A1 is directed to the read area RA positioned outside the read window 103. The lens 115 has such a focal distance that the reflected light from the read area is focused on the CCD area sensor AS. The read area RA is the area for optically reading the barcode BC attached to the commodity A as stated above. By this, the read area RA is made an image pickup area IA, and the CCD area sensor AS provided on the image pickup board 114 and the lens 115 can take an image of the barcode BC positioned in the read area RA as the image pickup area IA. Thus, the image pickup board 114, the lens 115 and the image processing board 116 constitute an image pickup section 117 while the read area RA is made the image pickup area IA.

As shown in FIG. 2, the read optical axis A1 of the CCD area sensor AS provided on the image pickup board 114 is arranged horizontally. On the other hand, in another embodiment, the scanner unit 110 may be incorporated in the housing 102 so that the read optical axis A1 is directed downward. In this case, it is desirable that the read optical axis A1 of the CCD area sensor AS is set to be inclined downward at an angle of about 15 degrees. By this, even when the operator holds the barcode BC attached to the commodity A upward and moves it in front of the read window 103, it is possible to raise the possibility that the barcode BC is read by the barcode scanner 101.

Further, the scanner unit 110 includes a transparent protective cover 118 at the opening recess 112. The protective cover 118 serves also as a cover section of the read window 103.

The illuminating section 111 has an LED 111a as a light source. In the light source by the LED 111a, its optical axis A2 is directed to the read area RA for optically reading the barcode BC attached to the commodity A. The optical axis A2 crosses the read optical axis A1 of the CCD area sensor AS provided on the image pickup board 114 in the read area RA. Accordingly, the illuminating section 111 has the optical axis nonparallel to the read optical axis A1 and illuminates the read area RA from a position above the CCD area sensor AS of the image pickup board 114. In the illuminating section 111 as stated above, only the single LED light source may be included, or plural LED light sources may be included.

The illuminating section 111 is positioned at a coupling portion between the housing 102 of the barcode scanner 101 and the operation section 104, and is positioned below the operation section 104. By this, the illuminating light from the illuminating section 111 does not directly enter the eyes of the operator who operates the barcode scanner 101.

Figure 3:
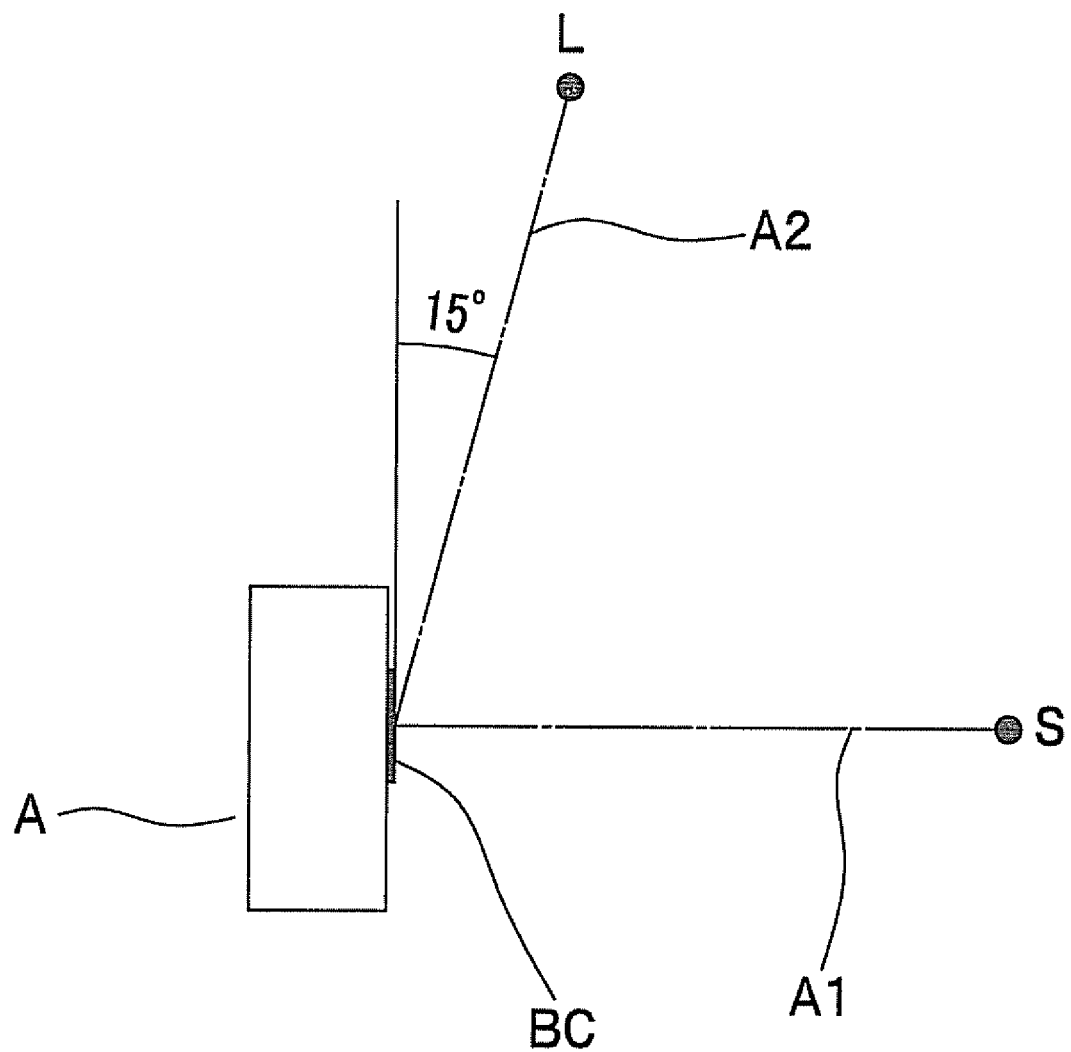
FIG. 3 is a schematic view showing a relation among a read optical axis of a CCD area sensor (area image pickup device), a reading target object and an optical axis of an LED light source (illuminating section).

FIG. 3 is a schematic view showing a relation among the read optical axis A1 of the CCD area sensor AS (point S in FIG. 3) provided on the image pickup board 114, the barcode BC as the reading target object and the optical axis A2 of the illuminating section 111 having the LED light source (point L in FIG. 3). As shown in FIG. 3, the illuminating section 111 is positioned at a position where an angle of the optical axis A2 not less than 15 degrees is obtained with respect to the plane including the barcode BC held in the direction orthogonal to the read optical axis A1 of the CCD area sensor AS. In other words, the illuminating section 111 is positioned at the position where the angle of the optical axis with respect to the plane orthogonal to the read optical axis A1 of the CCD area sensor AS is not less than 15 degrees.

When the angle of the optical axis A2 with respect to the plane including the barcode BC held in the direction orthogonal to the read optical axis A1 of the CCD area sensor AS is not less than 15 degrees, the image of the barcode BC held at such an angle can be suitably acquired. That is, when the optical axis A2 of the illuminating section 111 has such an angle, light of intensity sufficient for the CCD area sensor AS to take an image of the barcode BC can be given to the barcode BC.

In the structure as stated above, the LED light source of the illuminating section 111 has the optical axis A2 nonparallel to the read optical axis A1 and illuminates the read area RA from the position above the CCD area sensor AS provided on the image pickup board 114. By this, the light of the LED light source illuminated from the illuminating section 111 hardly enters the eyes of the operator. Accordingly, even in the vertical scanner type barcode scanner 101 in which the read surface confronts the operator, the operator does not feel glare due to the illuminating light to illuminate the barcode BC attached to the commodity A.

Especially, in this embodiment, the operation section 104 is provided at the upper part of the housing 102, the front of the operation section 104 extends to the nearer side than the front of the housing 102, and is disposed to be inclined downward. The illuminating section 111 is positioned below the operation section 104 as stated above. Thus, the light of the LED light source irradiated from the illuminating section 111 hardly directly enters the eyes of the operator.

Obviously, numerous modifications and variations of the present invention are possible in light of the above teachings. It is therefore to be understood that within the scope of the appended claims, the invention may be practiced otherwise than as specifically described herein.

What is claimed is:

1. A code symbol reading apparatus, comprising:
    a housing that is disposed on a counter on which a basket for containing a commodity to be purchased is put and is disposed at a position where the housing confronts an operator;
    a read window positioned on a front of the housing;
    an image pickup section having an area image pickup device that is arranged at a back of the read window and has, as an image pickup area, a read area of a code symbol attached to a commodity; and
    an illuminating section that has an optical axis nonparallel to a read optical axis of the area image pickup device and illuminates the read area from a position above the area image pickup device.

2. The apparatus according to claim 1, wherein the area image pickup device is disposed to direct a read optical axis downward.

3. The apparatus according to claim 1, wherein the illuminating section is positioned at a position where an optical axis angle with respect to a plane orthogonal to the read optical axis of the area image pickup device in the read area is not less than 15 degrees.

4. The apparatus according to claim 1, wherein the illuminating section is positioned at a position where an optical axis angle with respect to a plane including the code symbol held in a direction orthogonal to the read optical axis of the area image pickup device is not less than 15 degrees.

5. The apparatus according to claim 1, wherein the area image pickup device is a CCD area sensor.

6. The apparatus according to claim 1, wherein the illuminating section has an LED as a light source.

7. The apparatus according to claim 1, wherein
    the housing provides an operation section at an upper part thereof to extend from a front surface of the housing, and
    the illuminating section is positioned below the operation section.

8. The apparatus according to claim 7, wherein a front part of the operation section is inclined downward.

* * * * *